United States Patent [19]
Crouse et al.

[11] Patent Number: 5,434,477
[45] Date of Patent: Jul. 18, 1995

[54] CIRCUIT FOR POWERING A FLUORESCENT LAMP HAVING A TRANSISTOR COMMON TO BOTH INVERTER AND THE BOOST CONVERTER AND METHOD FOR OPERATING SUCH A CIRCUIT

[75] Inventors: Kent E. Crouse, Hanover Park; John G. Konopka, Barrington, both of Ill.

[73] Assignee: Motorola Lighting, Inc., Buffalo Grove, Ill.

[21] Appl. No.: 34,956

[22] Filed: Mar. 22, 1993

[51] Int. Cl.⁶ .......................................... H04B 41/29
[52] U.S. Cl. ............................ 315/209 R; 315/247; 315/DIG. 7
[58] Field of Search ............... 315/219, 247, 224, 307, 315/DIG. 5, DIG. 7, 209 R

[56] References Cited

U.S. PATENT DOCUMENTS

| | | | |
|---|---|---|---|
| 4,347,474 | 8/1982 | Brooks et al. | 323/222 |
| 4,388,562 | 6/1983 | Josephson | 315/205 |
| 5,019,959 | 5/1991 | MacDonald et al. | 363/134 |
| 5,063,331 | 11/1991 | Nostwick | 315/219 |
| 5,223,767 | 6/1993 | Kulka | 315/DIg. 7 |
| 5,291,101 | 3/1994 | Chandrasekaran | 315/219 |
| 5,313,142 | 5/1994 | Wong | 315/247 |

*Primary Examiner*—Andrew M. Dolinar
*Attorney, Agent, or Firm*—J. Ray Wood

[57] ABSTRACT

A circuit with a transistor common to both the inverter and the boost converter powers a gas discharge lamp. In a half-bridge inverter, a boost inductor is coupled between the rectifier and the junction between two switching circuits.

12 Claims, 4 Drawing Sheets

CIRCUIT FOR POWERING A FLUORESCENT LAMP HAVING A TRANSISTOR COMMON TO BOTH INVERTER AND THE BOOST CONVERTER AND METHOD FOR OPERATING SUCH A CIRCUIT

BACKGROUND OF THE INVENTION

Fluorescent lamps operate most efficiently if driven by AC (alternating current) power at a frequency of around 30 KHz (kilohertz). To operate efficiently from standard power distribution systems, an electronic ballast converts AC line power at 50 Hz (hertz) to 60 Hz to higher frequency AC power. The ballast must have a low power factor (PF) and produce little total harmonic distortion (THD) at the input AC line.

To accomplish these tasks, an electronic ballasts has a rectifier to convert AC power to DC power, a boost converter for increasing the voltage of the DC power above peak of the line as well as providing power factor correction, and an inverter for converting voltage; boosted DC power into AC power at around 30 KHz.

The boost converter consists of a boost inductor and a transistor operated as a switch. The output of the boost converter is connected to a half-bridge two transistors inverter. The output of the half-bridge inverter, through a transformer, drives the fluorescent lamps.

The usual topology of such a boost converter coupled to an inverter requires three power transistors. The result is a circuit with a large number of parts, and thus increased complexity and increased assembly costs.

BRIEF SUMMARY OF THE INVENTION

According to the present invention, there is provided a circuit for powering a fluorescent lamp from an AC power source at a first frequency. The circuit has a rectifier coupled to the source of AC power, a half bridge inverter coupled to the rectifier, the rectifier coupled to the half bridge inverter by an inductor. The inductor is coupled to the transistor junction of the half bridge inverter.

DESCRIPTION OF A PREFERRED EMBODIMENT

Figure 1:
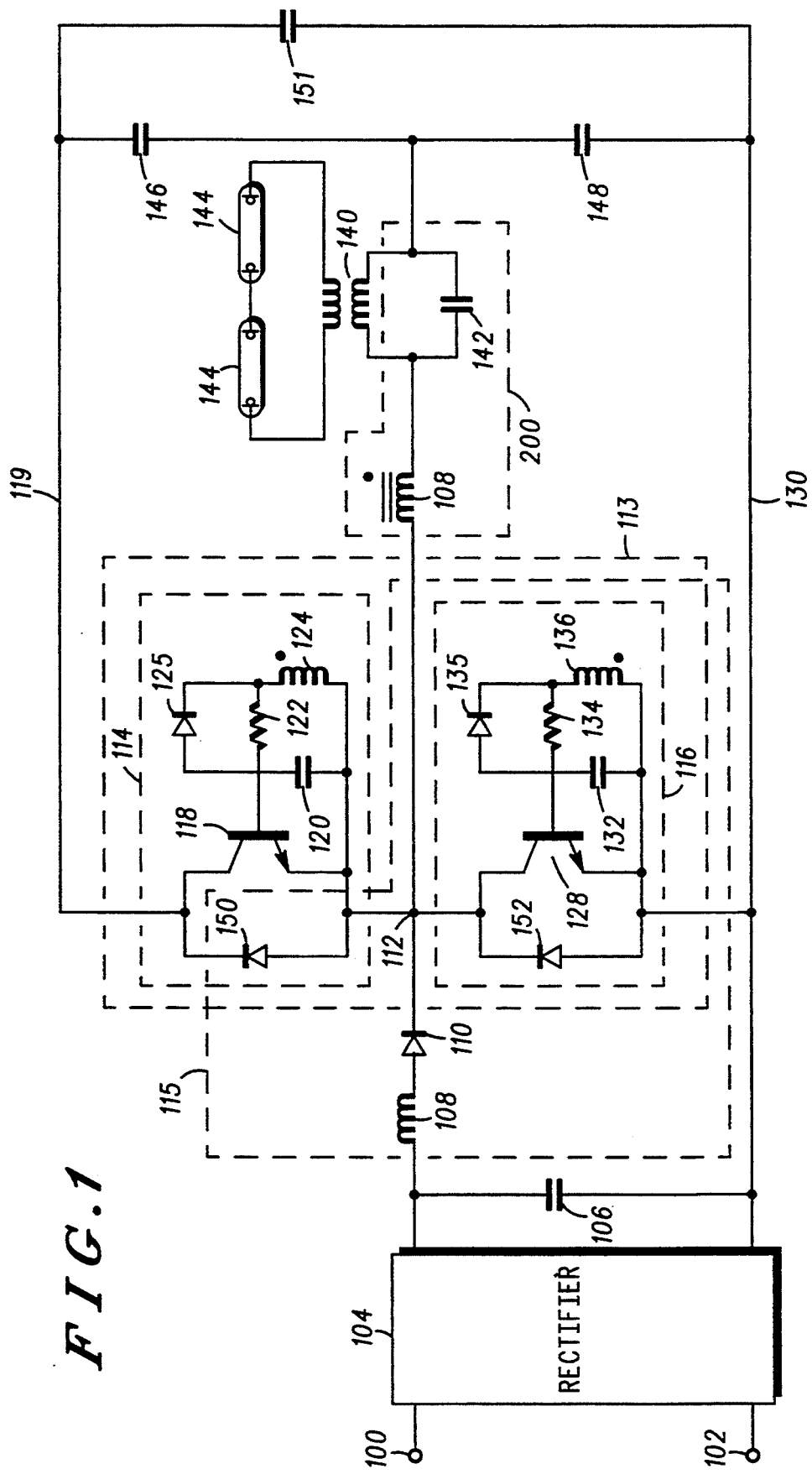
FIG. 1 is a circuit for powering gas discharge lamps.

Referring to FIG. 1, terminals 100, 102 receive AC power at a first, relatively low frequency about 60 Hz. Rectifier 104 converts the AC power into single polarity pulsed DC power. Rectifier 104 may be a full wave bridge rectifier.

Capacitor 106 connects the output terminals of rectifier 104. (Capacitor 106 could also be across terminals 100, 102.) Capacitor 106 is a low impedance current source for boost inductor 108. Boost inductor 108 stores energy and periodically releases the energy into the remainder of the circuit. Blocking diode 110, coupled between boost inductor 108 and node 112 prevents current from flowing in reverse through inductor 108 from the remainder of the circuit.

Switching circuit 114 consists of transistor 118 (shown here as a bipolar junction transistor (BJT), but it could easily be a field effect transistor (FET)). The collector of transistor 118 connects to upper rail 119, and the emitter connects to node 112. Node 112 is the transistor junction of the half bridge inverter. The base of transistor 118 is coupled to a network comprising capacitor 120 in parallel with resistor 122 and first secondary winding 124. Diode 125 is in parallel with resistor 122. First secondary winding 124 is from resonant inductor 126.

Switch 116 is configured similar to switch 114. The collector of transistor 128 is connected to node 112. The base of transistor 128 is connected to network composed of capacitor 132, resistor 134, and second secondary winding 136. Second secondary winding 136 is also from resonant inductor 126. Diode 135 is in parallel with resistor 134.

Node 112 is the junction between switching circuit 114, switching circuit 116, and blocking diode 110. Node 112 is also coupled to the primary winding of resonant inductor 126. The polarity of the second secondary winding 136 is of opposite phase, while the first secondary winding 124 in phase.

Thus, when current flows with a first polarity through the primary winding of base drive transformer 126, transistor 118 turns on, while transistor 128 turns off. When current flows with a reverse polarity through the primary winding of transformer 126, transistor 118 turns off, while transistor 128 turns on.

The primary winding of resonant inductor 126 is coupled to transformer 140. The primary winding of transformer 140 is in parallel with capacitor 142. The secondary winding of transformer 140 drives lamps 144. The electric power through lamps 144 is at a second frequency about 30 KHz.

Capacitor 146 couples the primary winding of transformer 140 to upper rail 119, while capacitor 148 couples the primary winding of transformer to lower rail 130.

Electrolytic capacitor 150 couples upper rail 119 to lower rail 130. Diodes 150, 1:52 couple the collector and emitter of transistors 118, 128, respectively. Diodes 150, 152 allow current to flow around transistors 118, 128 whenever the voltage between node 112 and the rails 119, 130 would cause current to flow from the emitter to the collector of transistors 118, 128.

Switching circuit 116, boost inductor 108, diode 150 and diode 110 form boost converter 115. Transistor 128 is a component of the boost converter 115 and half-bridge inverter 113.

The duty cycle of transistors 118, 128 vary dependent upon the voltage of the AC line. The ratio of the duty cycle of switch 118 to switch 128 is about 7:4 when the line voltage is at a peak. When the line voltage drops to 0, then the ratio of the duty cycles is about 1:1.

If the ratio of the duty cycles of switches 118, 128 were 1:1 over an entire cycle of AC line power, then too much energy would be stored and released over a short time, resulting in excessive lamp current. Conventionally, correction of the problem consists of increasing the inductance of boost inductor 108 or decreasing the capacitance of electrolytic 151, or both. This would, however, increase the THD imposed on the line.

The circuit varies the duty cycle of transistors 118, 128 as a function of the line voltage, thus maintaining proper lamp current without negatively effecting the THD or PF of the circuit.

The duty cycles of transistors 118, 128 vary dependent upon the instantaneous voltage of the line. When the line voltage is zero, the ratio of the duty cycles of transistors 118, 128 is about 1:1. At the peak line voltage, the ratio is about 7:4. The ratio of duty cycle limits the amount of energy stored in the boost inductor. Thus, the circuit is not over-driven.

The operation of the circuit when the line voltage is about zero is straightforward. The alternate operation of switching circuits 114, 116 releases energy stored in electrolytic 151 into transformer 140.

Figure 3:
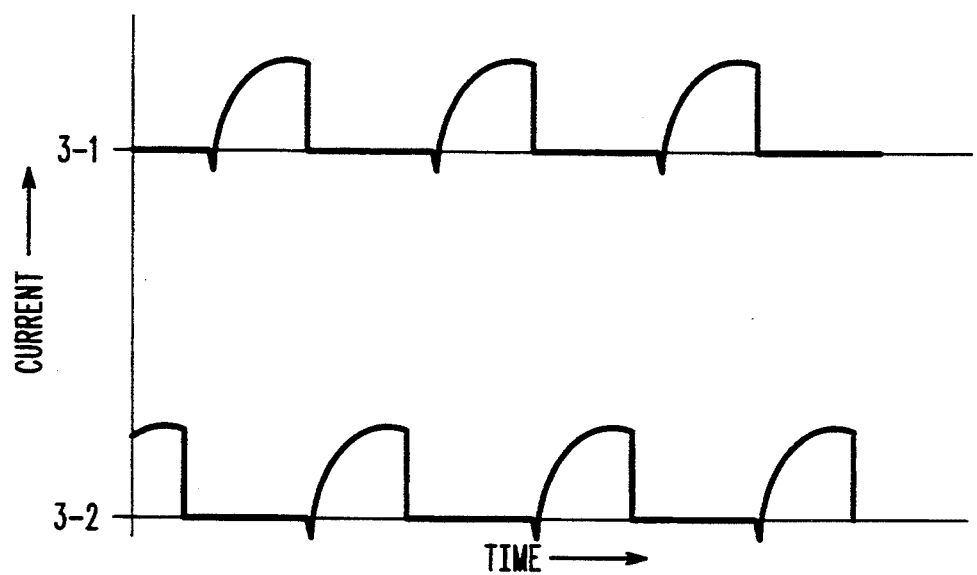
FIG. 3 shows the collector current for transistors 118 and 128 when the line voltage is approximately zero.

FIG. 3 shows the current through the collectors of transistors 118 and 128 when the line voltage is approximately zero. Each transistor is on the same amount of time, indicating that the ratio of the duty cycles is approximately one.

The circuit operates differently when the line voltage is not zero. When transistor 128 turns off, energy stored in boost inductor 108 forward biases diodes 110, 150, and thereby charges electrolytic 151. Since diodes 110, 150 are forward biased, node 112 is one diode drop higher than upper rail 119. Even when transistor 118 is on, no current flows through transistor 118.

Since boost inductor 108 acts as a current source, the current through tank circuit 200 never reaches the same peak as it would when the line voltage is at a minimum. When transistor 128 is on, the current reaches a higher peak and therefore will be on a shorter time to volts*time balance the resonant inductor, which causes the duty cycle of transistor 128 to be shorter than in transistor 118.

Thus, the on-time of the transistors dynamically varies with the line voltage. The on-time of transistor 128 decreases as the on time of transistor 118 increases, and the on-time of transistor 128 decreases as the line voltage increases.

Figure 4:
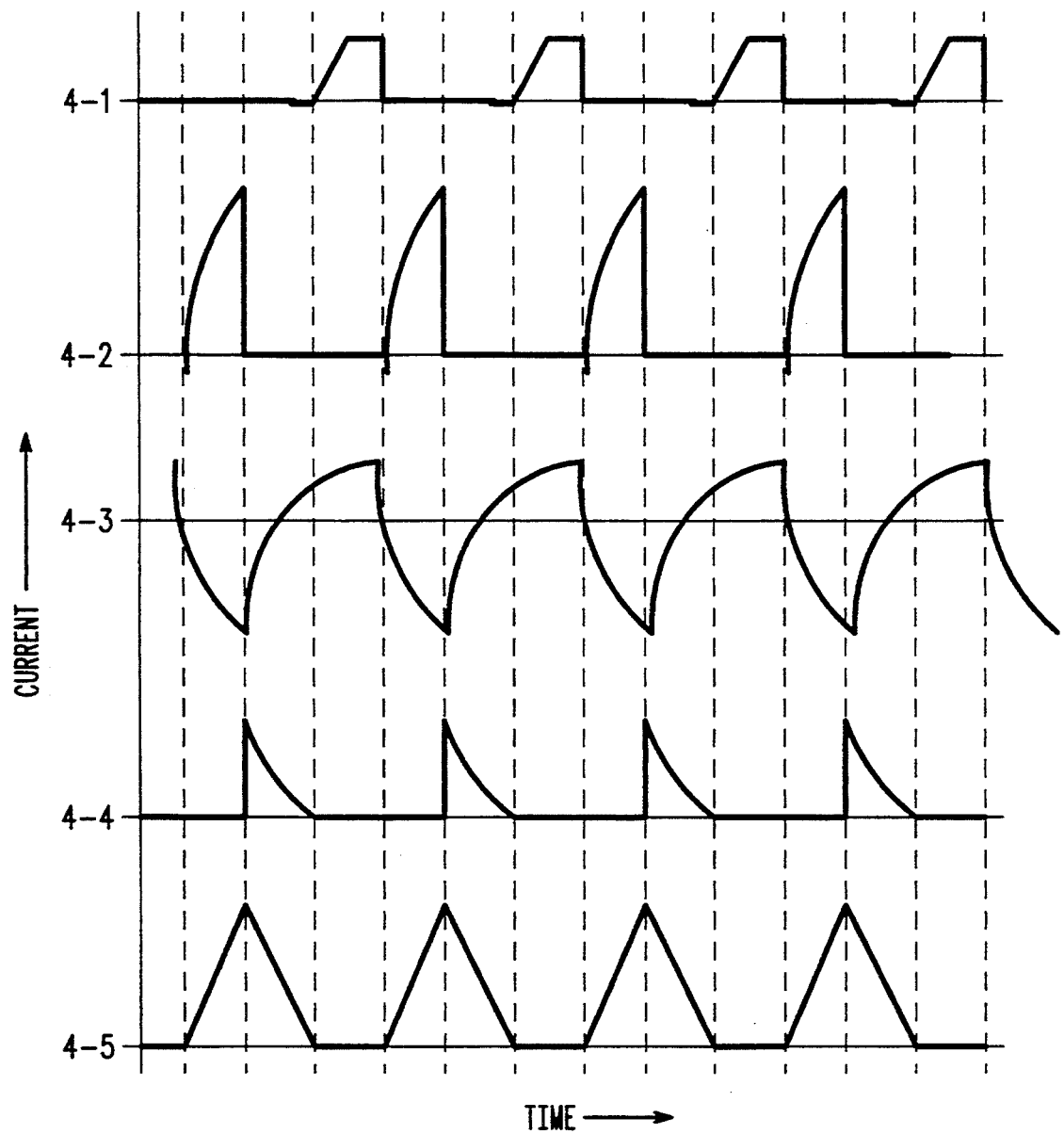
FIG. 4 shows the current through various circuit components when the line voltage is near the maximum.

FIG. 4 shows the current through various circuit components when the line voltage is near its maximum. FIG. 4-1 shows the collector current for transistor 118. The collector current is limited by the energy released from inductor 108, so that the collector current is limited.

Figure 2:
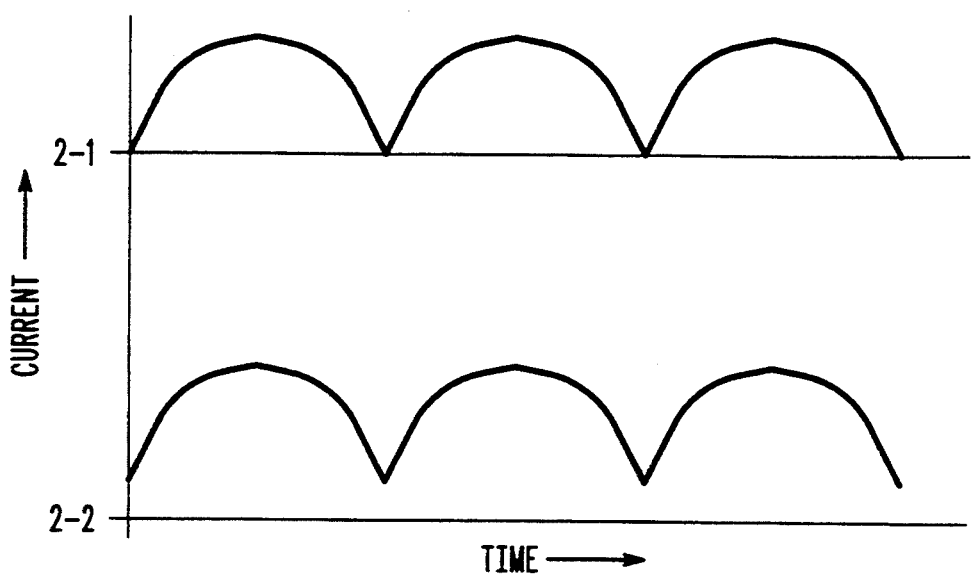
FIG. 2 shows the current envelope for current through boost inductor 108 and collector current for transistor 128.

The collector current for transistor 128, as shown by FIG. 4-2, is the sum of the current from boost inductor 108 and resonant tank circuit 200.

FIG. 4-3 shows the current in transformer 126. Due to additional current from boost inductor 108, the current in transformer 126 is asymmetrical. The coupling of the base drives of transistors 118 and 128 to the resonant inductor 126 causes the transistors to have different duty cycles.

FIG. 4—4 shows the current through diode 150. As can be seen by referring also to FIG. 4-1, transistor 118 does not turn on until the current through diode 150 is zero.

Figure 5:
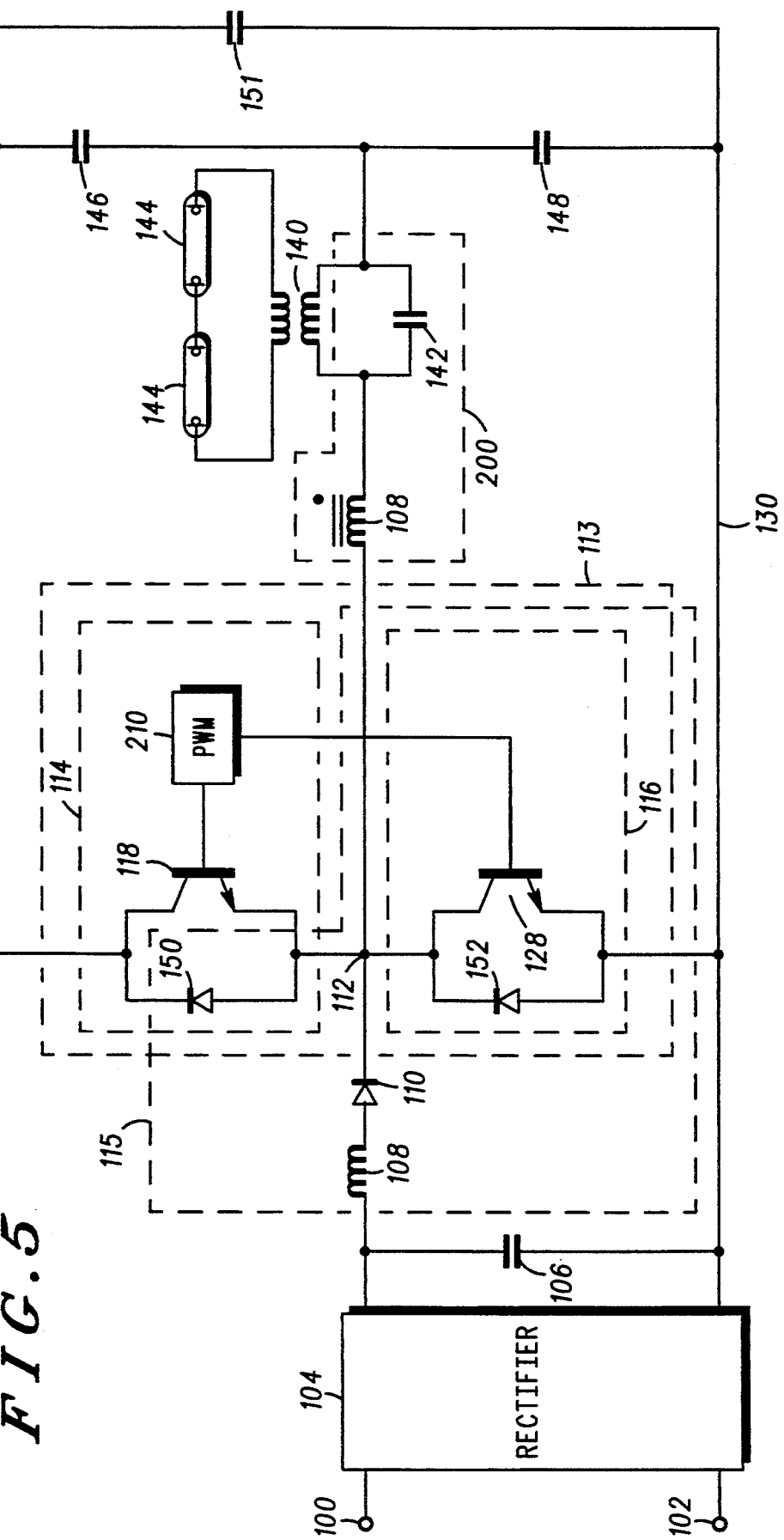
FIG. 5 shows a second circuit for powering gas discharge lamps.

FIG. 4-5 shows the current through boost inductor 108. The current in boost inductor 108 always falls to zero before the start of the next cycle.

The power factor correction of such a circuit is very good. A power factor more than 0.95 is possible. The current draw from AC line has a power factor of 0.95, which make the circuit as good as circuits employing a current mode control IC with a power FET. Thus, the circuit eliminates a power FET, an IC and Associated components for driving the FET.

Many modifications to the circuit are possible by one skilled in the art without departing from the general ideas stated herein. For example, the circuit shown in FIG. 1 employs a self regulating resonant tank circuit to drive transistors 118, 128. FIG. 5 shows a second circuit for powering gas discharge lamps. The circuit shown in FIG. 5 is the same as the circuit shown in FIG. 1 except that pulse width modulation (PWM) driver 210 controls the transistors 118, 128. Such a driver would vary the on-time of transistors 118, 128 in synchronization with the line voltage. When the voltage on the line is near maximum, the PWM driver would turn on the transistors for a shorter time. While near a zero voltage on the line, the PWM driver would turn the transistors on for longer periods of time.

We claim:

1. A circuit for powering a fluorescent lamp from an AC power source at a first frequency comprising:
   a rectifier coupled to the source of AC power at a first frequency;
   a half bridge inverter, comprised of two transistors, where the emitter of one transistor is coupled to the collector of the other transistor, forming a transistor junction, the half bridge inverter having an output of AC power at a second frequency coupled to the fluorescent lamps;
   the rectifier coupled to the transistor junction by an inductor.

2. The circuit of claim 1 further comprising control means for controlling the on times of each of the two transistors.

3. The circuit of claim 1 where the control means for controlling the on times of the two transistors is a self resonant circuit.

4. The circuit of claim 2 where the diode is connected between the inductor and the half bridge inverter.

5. The circuit of claim 2 where the control means is a pulse width modulation circuit synchronized to the voltage of the AC power source.

6. The circuit of claim 2 where the two transistors are a first transistor and a second transistor, each transistor having an on-time, and the pulse width modulation control circuit controls the on-time of each transistor so that the on time of the first transistor is longer than the on-time of the second transistor.

7. The circuit of claim 2 where the control means varies the on-times for the transistors in response to the voltage of the AC power at the first frequency.

8. The circuit of claim 2 where the control means controls the on-time of the first transistor and the second transistor such that the on time of the first transistor is longer than the on time of the second transistor.

9. The circuit of claim 8 where the ratio of the on-time of the first transistor to, the on-time of the second transistor is approximately 7:4 when the voltage of the AC power at a first frequency is at a maximum, and 1:1 when the voltage of the AC power at a first frequency is near zero.

10. A circuit for powering a fluorescent lamps from a source of AC power at a first frequency comprising:
    a rectifier coupled to the source of AC power;
    a boost converter coupled to the rectifier, the boost converter having a boost converter transistor;
    an inverter coupled to the boost converter, the inverter having at least one inverter transistor, the output of the inverter coupled to the fluorescent lamps for energizing the fluorescent lamps;
    where the boost converter transistor and the at least one inverter transistor are the same transistor.

11. The circuit of claim 10 where the inverter has two inverter transistors.

12. The circuit of claim 10 where the boost converter is coupled to the inverter through an inductor.

* * * * *